United States Patent
Aljuaydi et al.

(10) Patent No.: US 12,037,869 B1
(45) Date of Patent: Jul. 16, 2024

(54) PROCESS OF WATER SHUT OFF IN VERTICAL WELLS COMPLETED WITH ELECTRICAL SUBMERSIBLE PUMPS

(71) Applicant: SAUDI ARABIAN OIL COMPANY, Dhahran (SA)

(72) Inventors: Haitham Aljuaydi, Kharj (SA); Faisal Mohammed Alissa, Dammam (SA); Rashed Altowairqi, Taif (SA); Yazeed Alamro, Riyadh (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/157,326

(22) Filed: Jan. 20, 2023

(51) Int. Cl.
| | |
|---|---|
| E21B 33/138 | (2006.01) |
| C09K 8/42 | (2006.01) |
| C09K 8/44 | (2006.01) |
| C09K 8/504 | (2006.01) |
| E21B 37/00 | (2006.01) |
| E21B 43/12 | (2006.01) |

(52) U.S. Cl.
CPC ............ *E21B 33/138* (2013.01); *C09K 8/426* (2013.01); *C09K 8/44* (2013.01); *C09K 8/5045* (2013.01); *E21B 37/00* (2013.01); *C09K 2208/26* (2013.01); *E21B 43/128* (2013.01)

(58) Field of Classification Search
None
See application file for complete search history.

(56) References Cited

U.S. PATENT DOCUMENTS

| | | | | |
|---|---|---|---|---|
| 4,665,985 A | * | 5/1987 | Berrod | ............... C09K 8/845 166/292 |
| 4,745,139 A | | 5/1988 | Haasl et al. | |
| 5,476,145 A | | 12/1995 | Sengul et al. | |
| 6,121,336 A | | 9/2000 | Okoroafor et al. | |
| 6,497,290 B1 | * | 12/2002 | Misselbrook | ........... E21B 49/08 166/77.2 |

(Continued)

FOREIGN PATENT DOCUMENTS

| | | |
|---|---|---|
| JP | 2005526887 A | 9/2005 |
| JP | 2014196444 A | 10/2014 |

(Continued)

OTHER PUBLICATIONS

Gurav et al., "Silica Aerogel: Synthesis and Applications"; Journal of Nanomaterials, V. 2010, Article ID 409310 (12 pages).

(Continued)

*Primary Examiner* — Andrew Sue-Ako
(74) *Attorney, Agent, or Firm* — Osha Bergman Watanabe & Burton LLP

(57) ABSTRACT

A well system includes a well extending from a surface into a formation, a Y-tool provided at an end of a tubing string extending through the well, a concentric coiled tubing string extending through the tubing string and through a bypass line of the Y-tool, and a plurality of treatment solutions provided at the surface of the well. The plurality of treatment solutions includes at least one component of a dissolvable gel, a gel dissolving solution, and at least one component of a non-dissolvable gel. A method for plugging a water zone in a hydrocarbon bearing formation and a method for reducing a concentration of produced water from a hydrocarbon bearing formation are also described.

10 Claims, 8 Drawing Sheets

(56) References Cited

U.S. PATENT DOCUMENTS

| | | |
|---|---|---|
| 7,540,325 B2 | 6/2009 | Livingstone |
| 7,762,329 B1 | 7/2010 | Morgan et al. |
| 7,845,409 B2 | 12/2010 | Shinbach et al. |
| 7,886,826 B2 | 2/2011 | Robinson et al. |
| 9,453,156 B2 | 9/2016 | Wu |
| 2003/0220204 A1 | 11/2003 | Baran et al. |
| 2004/0003905 A1 | 1/2004 | Hilbig et al. |
| 2004/0060707 A1* | 4/2004 | Bearden ............ E21B 41/02 |
| | | 166/380 |
| 2006/0030632 A1 | 2/2006 | Krueger et al. |
| 2009/0205817 A1 | 8/2009 | Gustafson et al. |
| 2010/0224366 A1* | 9/2010 | Lende ............... C04B 28/02 |
| | | 166/292 |
| 2014/0060843 A1 | 3/2014 | Murphy et al. |
| 2016/0177166 A1 | 6/2016 | Reddy et al. |
| 2017/0187177 A1 | 6/2017 | Mangum |
| 2020/0355047 A1* | 11/2020 | Abdellatief ......... E21B 37/06 |
| 2021/0040821 A1 | 2/2021 | Hoffman |

FOREIGN PATENT DOCUMENTS

| | | |
|---|---|---|
| JP | 2016539200 A | 12/2016 |
| WO | 2004061046 A1 | 7/2004 |
| WO | 2014190226 A1 | 11/2014 |
| WO | 2015103096 A1 | 7/2015 |
| WO | 2022132552 A1 | 6/2022 |

OTHER PUBLICATIONS

Maleki et al., "An Overview on Silica Aerogels Synthesis and Different Mechanical Reinforcing Strategies"; Journal of Non-Crystalline Solids, vol. 385, Feb. 2014 (22 pages).

Cheng et al., "Cotton aerogels and cotton-cellulose aerogels from environmental waste for oil spillage cleanup"; Materials and Design (2017), pp. 452-458 (7 pages).

Hunt et al., "Kinetics of the Gelation of Colloidal Silica at Geothermal Conditions, and Implications for Reservoir Modification and Management"; Proceedings, Thirty-Eighth Workshop on Geothermal Reservoir Engineering, Feb. 11-13, 2013 (10 pages).

Keivani et al., "Synergistic Toughening in Ternary Silica/Hollow Glass Spheres/Epoxy Nanocomposites"; Polymer-Plastics Technology and Engineering, 2015: pp. 581-593 (15 pages).

Mutua et al., "Surface Modification of Hollow Glass Microspheres"; Materials Science and Applications, 2012, pp. 856-860 (5 pages).

Pojanavraphan et al., "Solution Cross-Linked Natural Rubber (NR)/Clay Aerogel Composites"; Macromolecules Article 2014, pp. 923-931 (9 pages).

Rotaru et al., "Performances of clay aerogel polymer composites for oil spill sorption: Experimental design and modeling"; Separation and Purification Technology (1 page).

Shi et al., "Superhydrophobic silica aerogels reinforced with polyacrylonitrile fibers for adsorbing oil from water and oil mixtures"; Royal Society of Chemistry, RSC Advances 2017 (7 pages).

Wang et al., "Ultralow Electrical Percolation in Melt-Compounded Polymer Composites Based on Chemically Expanded Graphite" (23 pages).

Zielinska et al., "Swelling of EPDM rubbers for oil-well applications as influenced by medium composition and temperature"; Elastomery (16 pages).

Zuo et al., "Polymer/Carbon-Based Hybrid Aerogels: Preparation, Properties and Applications"; Materials 2015, pp. 6806-6848 (43 pages).

Hunt et al., "Kinetics of the Gelation of Colloidal Silica at Geothermal Conditions, and Implications for Reservoir Modification and Management," Proceedings, Thirty-Eighth Workshop on Geothermal Reservoir Engineering Stanford University, Stanford, California, Feb. 11-13, 2013 SGP-TR-198, 10 pages.

Zhao et al., "Chemical Solution to ESP Packer Penetrator Corrosion Problem," International Petroleum Technology, PTC-19633-Abstract, Jan. 13, 2020, 7 pages.

Zhao et al., "Development of Low-Density Rigid Gels/Composites for ESP Packer Penetrator Protection," Society of Petroleum Engineers, SPE-192260-MS, Apr. 23-26, 2018, 10 pages.

* cited by examiner

PROCESS OF WATER SHUT OFF IN VERTICAL WELLS COMPLETED WITH ELECTRICAL SUBMERSIBLE PUMPS

BACKGROUND

Fluids are typically produced from a reservoir in a subterranean formation by drilling a wellbore into the subterranean formation, establishing a flow path between the reservoir and the wellbore, and conveying the fluids from the reservoir through the wellbore to a destination such as to the surface of the earth, to a bed of a body of water such as a lakebed or a seabed, or to a surface of a body of water such as a swamp, a lake, or an ocean (hereafter "surface"). Fluids produced from a hydrocarbon reservoir may include natural gas, oil, and water. Typically, a production tubing is disposed in the wellbore to carry the fluids to the surface. In some formations, pressure within the rock formation causes the resources to flow naturally from the formation to the surface. One common challenge in producing fluids from a hydrocarbon reservoir through a wellbore is that, in some formations, the pressure in the formation is not adequate to cause the flow against gravity out of the formation to the surface or is not adequate to cause the flow to meet flowrate goals.

In such instances, artificial lift technology can be used to add energy to fluid to bring the resources to the surface. Most wells have a variation of downhole equipment, such as Electrical Submersible Pump (ESP) systems, installed to help with the production of hydrocarbons. Once the ESP system is installed in the well, there is no way to access the main bore and any lateral bores without completely removing the ESP as through-tubing tools are unable to pass through the inside of the ESP. To avoid this, a bypassing tool referred to as a Y-tool, including a branched connection from the production tubing to an ESP line and a bypass line, may be installed. The ESP line and bypass line extend in parallel through the well from the production tubing, thereby limiting the amount of room in the well for each of the ESP and bypass line. Thus, the bypass line will have a smaller inner diameter for tool passage than the production tubing, thereby limiting tool access from the surface through the bypass line.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a well system that includes a well extending from a surface into a formation, a Y-tool provided at an end of a tubing string extending through the well, a concentric coiled tubing string extending through the tubing string and through a bypass line of the Y-tool, and a plurality of treatment solutions provided at the surface of the well. The plurality of treatment solutions include at least one component of a dissolvable gel, a gel dissolving solution, and at least one component of a non-dissolvable gel.

In another aspect, embodiments disclosed herein relate to a method for plugging a water zone in a hydrocarbon bearing formation that includes providing a Y-tool at an end of a tubing string in a well extending into the hydrocarbon bearing formation, the Y-tool comprising an electric submersible pump and a bypass line, introducing a concentric coiled tubing (CCT) through the tubing string and the bypass line to a target depth of the hydrocarbon bearing formation, and forming a water plugging gel at the target depth, wherein the target depth of the well comprises a water zone.

In another aspect, embodiments disclosed herein relate to a method for reducing a concentration of produced water from a hydrocarbon bearing formation that includes providing a Y-tool at an end of a tubing string in a well extending into the hydrocarbon bearing formation and introducing a concentric coiled tubing (CCT) through the tubing string and through a bypass line of the Y-tool to an open hole section of the well. The method also includes forming a dissolvable gel in the open hole section of the well to cover wellbore access to a water zone and a hydrocarbon zone in the open hole section of the well and dissolving a portion of the dissolvable gel to expose wellbore access to the water zone and provide a remaining portion of the dissolvable gel covering wellbore access to the hydrocarbon zone. The method also includes plugging the water zone via injection of a plugging solution and a cross-linking solution to form a non-dissolvable gel covering the wellbore access to the water zone and dissolving the remaining portion of the dissolvable gel covering the wellbore access to the hydrocarbon zone to provide fluid communication between the hydrocarbon zone and the well.

Other aspects and advantages of the claimed subject matter will be apparent from the following description and the appended claims.

DETAILED DESCRIPTION

Figure 1A:
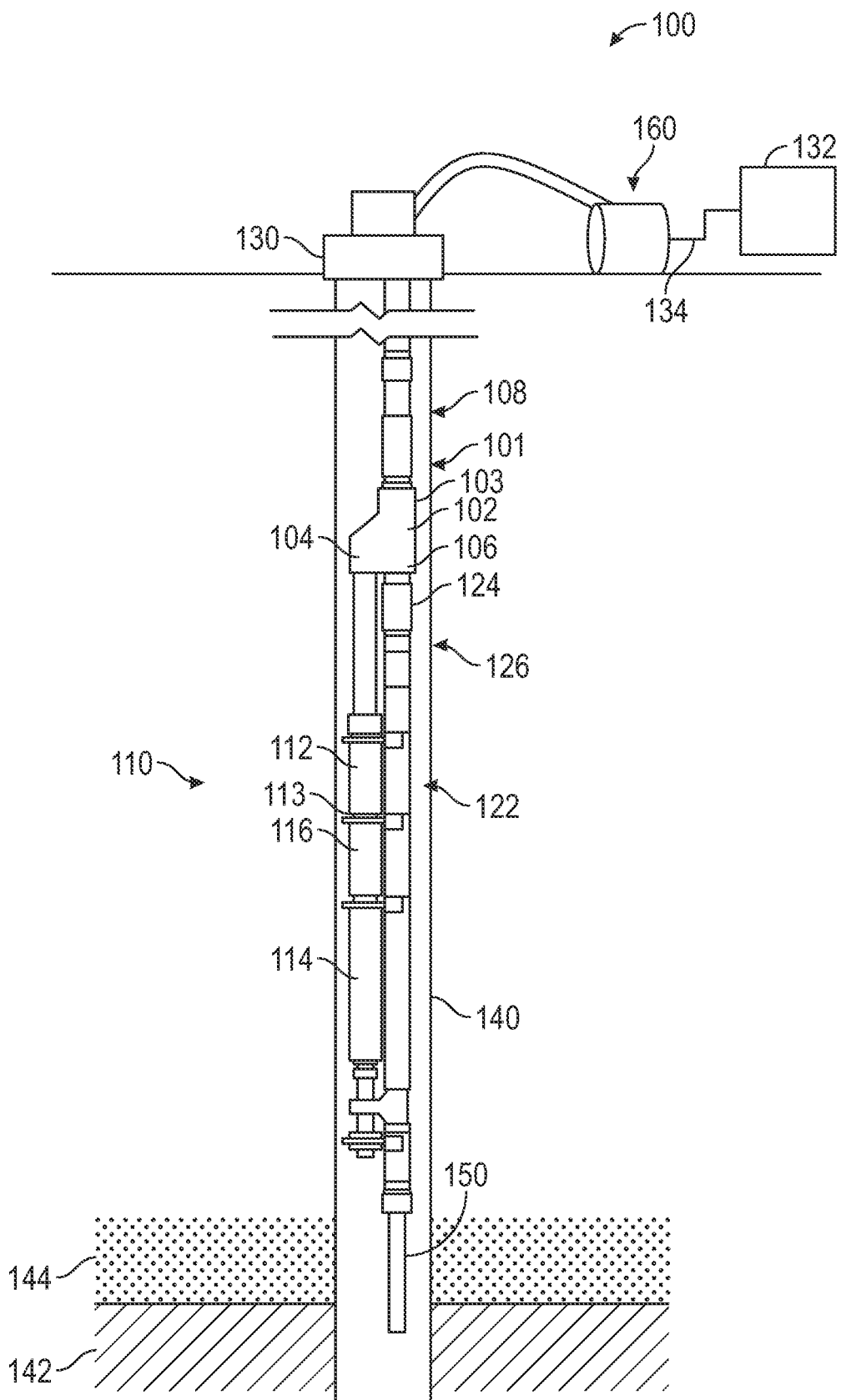
FIG. 1A is a submersible pump system connected to a Y-tool system in accordance with one or more embodiments.

In the oil and gas industry, an increasing amount of water produced from oil and gas wells is a common issue as oil fields mature, as increasing water production typically results in the burden of produced water management in addition to the dramatic reduction in oil production. Countermeasures are often needed to resolve this issue and reduce the amount of water produced to prolong the lifetime of a well. Conventionally, it requires mechanical aids for separating oil and water zones to facilitate the shutoff. However, a number of well and downhole tool parameters limit water shutoff operations, and as such, water shutoff is one of the most difficult operations in the oil and gas industry.

For example, pressure is often the driving mechanism of oil and gas wells for the production of hydrocarbons from a hydrocarbon bearing reservoir. However, some reservoirs do not have sufficient pressure capable of producing hydrocarbons naturally. This results in the use of artificial lifts, such as Electrical Submersible Pumps (ESPs), to lift the crude hydrocarbons to surface by pumping it to surface and maintaining the flow of produced hydrocarbons via rotary stages. However, the installation of an ESP in a wellbore may also prevent well accessibility. To provide well accessibility around an ESP, a bypassing tool, such as a Y-tool, may be installed. As described in more detail below, a Y-tool may generally include pump line and a bypass line extending in parallel from a Y-block, which may be connected to production tubing. Thus, because the Y-tool is designed to fit two parallel lines through the well from a single line of production tubing, each line of the Y-tool has a reduced size compared to the production tubing. For example, the bypass line of a Y-tool may have an inner diameter of about 2.4 inches, whereas a production tubing may have an inner diameter ranging from about 3 to 3.5 inches.

Additionally, in conventional water shutoff operations, it is important to produce hydrocarbons while isolating the water zone. In this respect, having a mechanical tool, such as a retrievable packer, installed between zones to isolate the water zone from the hydrocarbon zone is crucial for the success of the operation. In order to install a retrievable packer in a downhole location, the packer is run from the surface through production tubing to the downhole location. At the downhole location, the packer may be expanded to contact and seal around the well wall. Therefore, the packer must be capable of fitting through the production tubing in unexpanded form and capable of expanding to the well diameter. For example, wells are often constructed vertically with an open hole section of about 8.5 inches in diameter to increase the reservoir contact with the well. In such situations, a retrievable packer sent through a typical production tubing having an inner diameter of about 3-3.5 inches is needed to expand from about 3-3.5 inches, which correspond to production tubing inner diameter, to about 8.5 inches corresponding to the open hole section diameter.

In reservoirs where water zone isolation as well as pressure control is necessary, the installation of an ESP with a Y-tool may significantly reduce the inner diameter of the access path through the well, as discussed above, through which an expandable packer may be sent to a downhole location (e.g., in an open hole section of the well). For example, installation of a Y-tool having a bypass line with an inner diameter of 2.4 inches would require the packer to have a maximum allowable unexpanded size of less than 2.4 inches to pass through the bypass line of the Y-tool and reach the open hole section. As mentioned above, wells are often constructed with an open hole diameter of about 8.5 inches to increase the reservoir contact with the wellbore as well as increasing productivity of a well. Currently, there is no readily available mechanical packer capable of expanding from 2.4 inches to 8.5 inches.

One or more embodiments of the present disclosure relate to a well system and a method to separate hydrocarbon and water zones, and a method to facilitate water shutting off in wells without using a mechanical packer.

Well System

In one aspect, embodiments disclosed herein relate to a well system that may be used for sealing a water zone in a well for water shut off. The well system may include a well extending from a surface into a formation and through at least one water zone. A water zone in a well may refer to part of an aquifer or water-bearing formation that is fluidly connected to and yields water to the well. The well may be a vertical well. In one or more embodiments, the well may extend through a hydrocarbon bearing formation that includes a hydrocarbon zone (e.g., an oil zone) and a water zone. The hydrocarbon zone may include one or more hydrocarbons, such as oil or gas. The water zone may include formation water or brine. In one or more embodiments, the water zone is disposed at a greater depth than the hydrocarbon zone of a vertical well. In some embodiments, the water zone is disposed at a greater depth and in fluid connection with the hydrocarbon zone of the vertical well.

Well systems disclosed herein may include well equipment that are assembled together in a manner to provide one or more components of a treatment solution to plug a water zone in a well while maintaining a downhole pump (e.g., in an ESP) in the well to pump fluids to the surface. According to embodiments of the present disclosure, the well equipment in a well system may include a Y-tool provided at an end of a tubing string extending through a well. In one or more embodiments, a Y-tool system is connected with an ESP system. The Y-tool may include a Y-block connecting with a bypass system used to provide access to the wellbore below the ESP without the need of retrieving the ESP. A top side of the Y-block is connected to the production tubing and the lower side is connected to two separate conduits: a pump line, which includes an ESP, and a bypass line. The ESP and the Y-tool may be suspended in the well from the bottom of the tubing string to a location proximate to an open hole section of the well. The ESP may be operated to retrieve fluid from the producing formation, increase the pressure of the fluid, and discharge the pressurized fluid into the production tubing. Pressurized fluid in the production tubing rises to the surface due to differences in pressure. The bypass line of the Y-tool may provide access for concentric coiled tubing (CCT), which is described in more detail below, to be run from the surface of the well to a target downhole location in the well. One or more components of a treatment solution provided from the surface of the well may then be supplied through the CCT to the target downhole location.

Figure 1B:
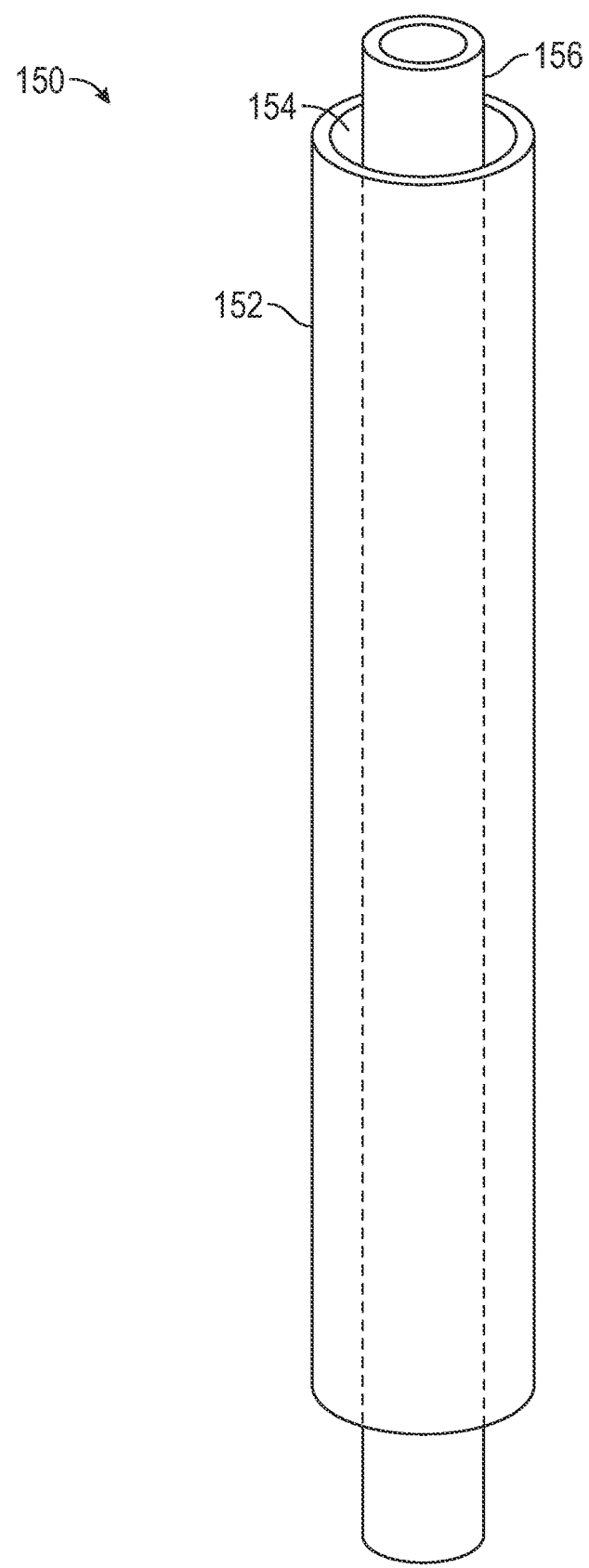
FIG. 1B is a diagram of a portion of concentric coiled tubing for use in methods in accordance with one or more embodiments.
Figure 1C:
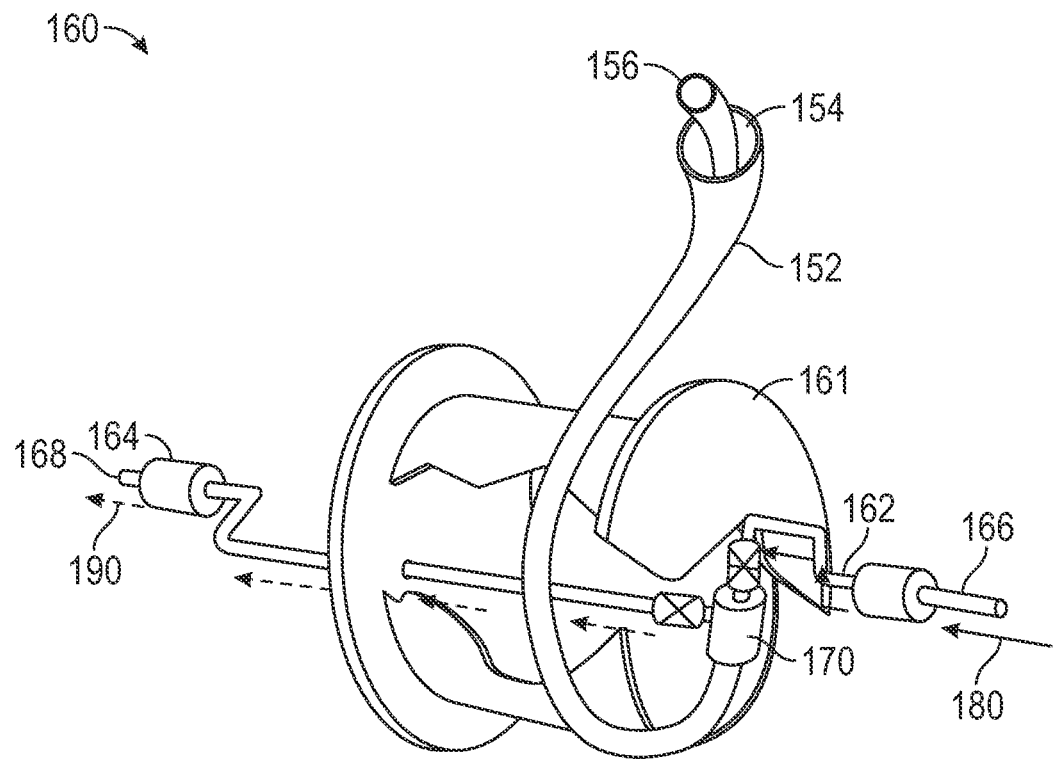
FIG. 1C is a diagram of a concentric coiled tubing system including concentric tubing attached to a vacuum apparatus in accordance with one or more embodiments.

Referring to FIGS. 1A-1C, a well system 100 according to embodiments of the present disclosure is shown. The well system 100 includes a well 140 extending from a surface through a hydrocarbon zone 144 and a water zone 142 in a formation and wellhead equipment 130 provided at an opening of the well 140. A tubing string 108 extends through the well 140 from the wellhead equipment 130, and a Y-tool system 101 is connected at an end of the tubing string 108 (e.g., production tubing). The Y-tool system 101 primarily includes a Y-block 102 having a main tubing branch 103, a pump branch 104 and a bypass branch 106. As shown, the Y-block 102 has a general shape consistent with an inverted letter "Y". The main tubing branch 103 is configured to couple to a tubing string 108 suspended from the wellhead equipment 130. The Y-tool system 101 also includes an electric submersible pump (ESP) 110 coupled to the pump branch 104 and a bypass line 122 coupled to the bypass branch 106, where the ESP 110 extends generally parallel to the bypass line 122. The Y-tool system 101 may include a valve assembly 124 coupled to the bypass branch 106 of the Y-Block 102 to provide selective access to one or more production zones through the bypass tubing 122. As shown in FIG. 1A, the valve assembly 124 may be positioned directly below the Y-Block 102. In one or more embodiments, the valve assembly 124 may be disposed within a nipple 126 coupled to the bypass branch 106 of the Y-Block 102.

In the embodiment shown, the ESP 110 includes a pump 112, such as a multistage centrifugal pump, with one or more fluid intakes 113, a motor 114, and a seal section 116. Each stage of the centrifugal pump includes an impeller (not shown) and a diffuser (not shown). The seal section 116 may include a mechanical seal (not shown) that sealingly couples the motor 114 and the pump 112 and prevents well fluids from entering the motor 114. The ESP may also include a gas separator to remove gases from the fluid and send the gases uphole through the annulus between the casing and the production tubing rather than through the pump 112. Various types and configurations of ESPs may be used according to embodiments of the present disclosure.

An electrical power cable may be coupled to the motor to provide power to the motor 114 from a power source to run the pump 112. For example, three-phase electrical power may be provided from a power source at the surface of the well down to the motor 114 to rotate the pump 112. Surface controls (e.g., switchboards/variable speed drives) at the surface of the well may control starting up and shutting down of the ESP 110.

The ESP 110 may be operated manually or automatically in response to a measured parameter signal sensed from a downhole sensor or tool. Upon operation, the motor rotates the pump 112 which draws reservoir fluids into the pump 112 through the fluid intake(s) 113. As the impeller (not shown) rotates within the diffuser of each stage of the pump 112, the velocity of the fluid is reduced, and the pressure is increased. Fluid may be discharged into a space formed in a pump casing and fed into the next impeller of the next stage. The number of stages of the pump 112 may be pre-selected based on a desired increase in pressure of the fluid. Fluid is discharged from the last stage, exits the pump 112, and travels up through the Y-block 102 and into the tubing string 108 to the surface of the well.

When the ESP 110 is turned off, fluid may be bypassed via the bypass line 122. Thus, various downhole zones in a well may be selectively accessed from the surface of the well through the bypass line 122. In some embodiments, the downhole zones may be accessed with equipment, such as CCT, logging equipment, repair equipment, etc., through the bypass line 122. In some embodiments, a bypass plug is disposed in the bypass line 122 to prevent access to a deeper section of the well (e.g., to a lower open hole section of the well).

The well system 100 further includes the use of a CCT string 150 operable to inject one or more components of a treatment solution from a treatment component source 132 via one or more treatment flowlines 134. CCT is a type of coiled tubing with a pipe inside the coil tubing pipe to enable the delivery of a plurality of treatment solutions to a target location of a well, a target depth of a vertical well, or both. CCT is shown in more detail in FIG. 1B. The CCT string 150 extends from a CCT system 160, shown in more detail in FIG. 1C, to the well, where the CCT extends through the tubing string 108 and through a bypass line 122 of the connected Y-tool 101.

Referring now to FIG. 1B, a diagram is provided of a portion of CCT string 150 for use in systems and methods in accordance with one or more embodiments. CCT string 150 includes outer coil 152, inner coil 156, and an annulus 154 disposed between outer coil 152 and inner coil 156. As shown, inner coil 156 is concentrically disposed within outer coil 152. With CCT string 150, two fluids can be injected separately into a target location and then combined (e.g., in a selected downhole zone). For example, a first component of a dissolvable gel and a second component of a dissolvable gel may be injected separately and combined at the target location, to provide control over the placement of and dissolvable gel formation at a target location.

FIG. 1C is a diagram of the CCT system 160 used in well system 100, where the CCT system 160 includes CCT string 150 attached to a vacuum apparatus 161. As described above, the CCT includes an outer coil 152, an inner coil 156 concentrically disposed within the outer coil 152, and an annulus 154 formed between the outer and inner coils 152, 156. The vacuum apparatus includes a first rotating joint 162 proximate to a fluid inlet 166 and a second rotating joint 164 proximate to a vacuum outlet 168. The fluid inlet 166 may be an inlet to deliver injection fluids (represented by arrow 180) to a well via CCT string 150.

In one or more embodiments, a vacuum may be provided to the CCT system 160 to allow for fluids downhole to be produced to the surface without creating circulation. As shown in FIG. 1C, a vacuum may be created by providing suction (indicated by dashed arrows 190) from the vacuum outlet 168. In such embodiments, the vacuum outlet 168 is in fluid connection with a vacuuming joint 170 in fluid connection with CCT string 150 and fluid inlet 166.

In some embodiments, a plurality of treatment solutions is pumped into a well at a target location, such as at a target depth of a water and/or hydrocarbon zone in a vertical well, using a CCT string 150 string that will pump one or more components of the treatment solutions alone at different times or separately at the same time. The plurality of treatment solutions may be pumped to the target location of the well such that one or more components of the treatment solutions may meet and react once they reach the target location.

Injection of a plurality of treatment solutions may be performed while simultaneously moving the CCT string 150 out of the well towards a surface opening of the well. For example, the bypass line of the Y-tool installed with an ESP on a production tubing allows for the placement of CCT string 150, to place one or more of the plurality of treatment solutions at a target location of the well. CCT string 150 can be withdrawn as the plurality of treatment solutions are injected to allow for coverage of a hydrocarbon zone, a water zone, or both of the open hole section of the well.

In one or more embodiments, the plurality of treatment solutions may include at least one component of a dissolvable gel, a gel dissolving solution, and at least one component of a non-dissolvable gel. In one or more embodiments, the at least one component of the dissolvable gel provides the dissolvable gel at the injected location in the well.

The at least one component of the dissolvable gel may include two or more gelling components. The two or more gelling components may be separately provided to the formation in the form of a first gelling solution and a second gelling solution. In some embodiments, the at least one component of the dissolvable gel is injected in the well such that a dissolvable gel forms in the well to provide a layer of dissolvable gel over a hydrocarbon zone and a water zone of the formation, thereby covering and shutting off well access to the hydrocarbon and water zones.

For example, the first gelling solution may be injected through the CCT string 150 and injecting a second gelling solution through the CCT string 150 to activate the first gelling solution. The first gelling solution may include injecting the first gelling solution via an inner passage, such as an inner coil 156, of the CCT string 150. Injecting the second gelling solution may include injecting the second gelling solution via an outer passage, such as the outer coil 152, of the CCT string 150. The layer of dissolvable gel formed around the well wall may block well access to the oil zone and the water zone. In one or more particular embodiments, a layer of dissolvable gel forms after about 10 minutes. In one or more embodiments, the process described above can be repeated until the target location of the well, such as both the water zone and the hydrocarbon zone, are blocked with the dissolvable gel.

In one or more embodiments, the first gelling solution comprises a first aqueous fluid and a first dissolvable gel component. The first dissolvable gel component may include one or more components selected from the group consisting of colloidal silica, viscoelastic surfactants, and combinations thereof. In some embodiments, the first dissolvable gel component includes a colloidal silica, such as Levasil® CB17 Colloidal Silica from Nouryon. As one of ordinary skill may appreciate, the one or more viscoelastic surfactants may be a known diverting agent that forms a dissolvable gel upon mixing with a calcium brine. Non-limiting examples of viscoelastic surfactants may include zwitterionic surfactants, ethoxylated quaternary amines, amidoamine oxide surfactants, among others.

In some embodiments, the first gelling solution includes from about 0.1 wt % to 20 wt % of the first dissolvable gel component based on the total weight of the first gelling solution. For example, the first gelling solution may include the first dissolvable gel component in an amount ranging from a lower limit of one of 0.1, 0.5, 1, 2, 5, 7.5, 10, 12, and 15 wt % to an upper limit of one of 5, 7.5, 10, 11, 12.5, 15, 17.5 and 20 wt %, where any lower limit may be paired with any mathematically compatible upper limit.

In one or more embodiments, the second gelling solution comprises a second aqueous fluid and second dissolvable gel component. The second dissolvable gel component may include sodium chloride (NaCl). In one or more embodiments, the second gelling solution includes a calcium brine. In such embodiments the second dissolvable gel component includes calcium ions dissolved in an aqueous carrier fluid.

In some embodiments, the second gelling solution includes from about 0.1 wt % to 20 wt % of the second dissolvable gel component based on the total weight of the second gelling solution. For example, the second gelling solution may include the second dissolvable component in an amount ranging from a lower limit of one of 0.1, 0.5, 1, 2, 5, 7.5, 10, 12, and 15 wt % to an upper limit of one of 5, 7.5, 10, 11, 12.5, 15, 17.5 and 20 wt %, where any lower limit may be paired with any mathematically compatible upper limit.

A gel dissolving solution may be injected to dissolve a portion or all of a layer of dissolvable gel formed in the well. The gel dissolving solution may include a third aqueous fluid and gel dissolving component. In some embodiments, the gel dissolving component includes potassium hydroxide (KOH). In such embodiments, the gel dissolving solution may include from about 0.1 wt % to 30 wt % of the gel dissolving component based on the total weight of the gel dissolving solution. For example, the gel dissolving solution includes the gel dissolving component in an amount ranging from a lower limit of one of 0.1, 0.5, 1, 2, 5, 7.5, 10, 12, and 15 wt % to an upper limit of one of 15, 17.5, 20, 22, 25, 27.5 and 30 wt %, where any lower limit may be paired with any mathematically compatible upper limit.

In one or more embodiments, the gel dissolving component is a co-solvent, such as butoxyethanol. In such embodiments, the gel dissolving solution may include from about 0.1 wt % to 20 wt % of the gel dissolving component based on the total weight of the gel dissolving solution. For example, the gel dissolving solution may include the gel dissolving component in an amount ranging from a lower limit of one of 0.1, 0.5, 1, 2, 5, 7.5, 10, 12, and 15 wt % to an upper limit of one of 5, 7.5, 10, 11, 12.5, 15, 17.5 and 20 wt %, where any lower limit may be paired with any mathematically compatible upper limit.

The component(s) of the non-dissolvable gel may be injected to block (or "plug") wellbore access to a zone of the well, such as a water zone of an open hole section. The component(s) may form a layer of non-dissolvable gel around the well wall in a target location of the well.

In one or more embodiments, the component(s) of the non-dissolvable gel includes a plugging solution and a crosslinking solution. The plugging solution may include a fourth aqueous fluid and one or more plugging components selected from the group consisting of N,N'-methylenebisacrylamide (Bis), N,N'-(1,2-dihydroxyethylene) bisacrylamide (DHEBA), acrylamide, and combinations thereof.

In some embodiments, the plugging solution includes from about 2.5 wt % to 30 wt % of Bis based on the total weight of the plugging solution. For example, the plugging solution may include Bis in an amount ranging from a lower limit of one of 2.5, 4, 5, 7.5, 10, 12, and 15 wt % to an upper limit of one of 5, 7.5, 10, 12.5, 15, 17.5, 20, 25, and 30 wt %, where any lower limit may be paired with any mathematically compatible upper limit.

In some embodiments, the plugging solution includes from about 2.5 wt % to 30 wt % of DHEBA based on the total weight of the plugging solution. For example, the plugging solution may include DHEBA in an amount ranging from a lower limit of one of 2.5, 4, 5, 7.5, 10, 12, and 15 wt % to an upper limit of one of 5, 7.5, 10, 12.5, 15, 17.5, 20, 25, and 30 wt %, where any lower limit may be paired with any mathematically compatible upper limit.

In some embodiments, the plugging solution includes from about 2.5 wt % to 30 wt % of acrylamide based on the total weight of the plugging solution. For example, the plugging solution may include acrylamide in an amount ranging from a lower limit of one of 2.5, 4, 5, 7.5, 10, 12, and 15 wt % to an upper limit of one of 5, 7.5, 10, 12.5, 15, 17.5, 20, 25, and 30 wt %, where any lower limit may be paired with any mathematically compatible upper limit.

The crosslinking solution may include a crosslinker and a fifth aqueous fluid. The crosslinker may be selected from the group consisting of tetramethylethylenediamine (TEMEDA), ammonium persulfate (APS), and combinations thereof. In some embodiments, the crosslinking solution includes from about 0.5 barrels of oil (bbl), where 1 bbl equates to a volume of 42 gallons, to 15 bbl of one or more crosslinkers. For example, the crosslinking solution may include one or more crosslinkers in an amount ranging from a lower limit of one of 0.5 bbl, 0.75, 1, 2.5, 5, and 7.5 bbl to an upper limit of one of 5, 7.5, 10, 12.5, and 15 bbl of the one or more crosslinkers based on the total weight of the gel dissolving solution, where any lower limit may be paired with any mathematically compatible upper limit.

In some embodiments, the one or more crosslinkers includes an aqueous solution of APS. The aqueous solution of APS may include APS in a range from about a 30 wt % to 75 wt % based on the total weight of the aqueous solution of APS. For example, the aqueous solution of APS may include APS in an amount ranging from a lower limit of one of 30 wt %, 35, 40, 45, 50, and 55 wt % to an upper limit of one of 45, 50, 55, 60, 65, 70, and 75 wt %, where any lower limit may be paired with any mathematically compatible upper limit.

An aqueous fluid of one or more embodiments, such as the first aqueous fluid, second aqueous fluid, third aqueous fluid, fourth aqueous fluid, sixth aqueous fluid, an aqueous carrier fluid, or combinations thereof includes a water-based fluid. The water-based fluid may be distilled water, brine, deionized water, tap water, fresh water from surface or subsurface sources, formation water produced from the structural low, formation water produced from a different geologic formation, production water, frac or flowback water, natural and synthetic brines, residual brine from desalination processing, a regional water source, such as fresh water, brackish water, natural and synthetic sea water, potable water, non-potable water, other waters, and combinations thereof, that are suitable for use in a wellbore environment. In one or more embodiments, the water used may naturally contain contaminants, such as salts, ions, minerals, organics, and combinations thereof, as long as the contaminants do not interfere with formation of a gel or the dissolution of a gel. In one or more embodiments, the aqueous fluid includes additives such as viscosifiers, polymers, surfactants, and combinations thereof.

One or more of the components forming a dissolvable gel, a non-dissolvable gel, and/or other well treatment may be provided at the surface of a well system, e.g., in one or more storage tanks, such as shown in FIG. 1A. For example, as shown in FIG. 1A, one or more treatment component sources 132 (e.g., a first aqueous fluid, a second aqueous fluid, a third aqueous fluid, a fourth aqueous fluid, a fifth aqueous fluid, a first dissolvable gel component, a second dissolvable gel component, a gel dissolving component, a plugging component, a crosslinker) may be fluidly connected to a well to send the treatment components downhole. In some embodiments, treatment component sources 132 may be fluidly connected to the well via a CCT system 160, such that one or more treatment components may be sent downhole via a CCT string 150.

Preparation of the Plurality of Treatment Solutions

In one or more embodiments, the plurality of treatment solutions is provided at a surface location of the well. As one of ordinary skill may appreciate, the plurality of treatment solutions may be prepared on location at the surface location of the well in equipment suitable for mixing solutions. In some embodiments, the plurality of treatment solutions may be prepared at an off-site location.

In one or more embodiments, a volume of each of the plurality of treatment solutions is calculated. The volume of each of the plurality of treatment solutions may be calculated from a tubing volume calculation and an open hole volume calculation. The tubing volume calculation may be as presented in Equation 1, below.

$$V_{tbg} = \frac{(ID_{tbg})^2 \times L_{tbg}}{1029.4} \tag{1}$$

where tubing volume ($V_{tbg}$) is determined from the inner diameter of the tubing ($ID_{tbg}$), the tubing length ($L_{tbg}$) is the length of the tubing extended into the well, and the constant value of 1029.4 feet per barrel of oil. In such embodiments, the tubing volume ($V_{tbg}$) may be determined in units of barrels of oil (bbl), where 1 bbl equates to a volume of 42 gallons. For example, if the inner diameter of the tubing is 4.5 inches ($ID_{tbg}$) and the tubing length ($L_{tbg}$) is 4000 feet, the tubing volume ($V_{tbg}$) is 78.68 bbl. Additionally, if the inner diameter of the well annulus ($ID_{tbg}$) is 4 inches and the length of the well ($L_{oh}$) is 4000 feet, the open hole volume is 62.17 bbl.

The open hole volume may be determined using Equation 2, below.

$$V_{oh} = \frac{(ID_{oh})^2 \times L_{oh}}{1029.4}$$

where open hole volume ($V_{oh}$) is determined from the inner diameter of the well annulus ($ID_{oh}$), the length of the well ($L_{oh}$) and the constant value of 1029.4 feet per barrel of oil. In such embodiments, the open hole volume ($V_{oh}$) may be determined in units of barrels of oil (bbl), where 1 bbl equates to a volume of 42 gallons. For example, if the inner diameter of the well annulus ($ID_{oh}$) is 8.5 inches and the length of the well ($L_{oh}$) is 7000 feet, the open hole volume is 137.70 bbl.

In one or more embodiments, the amount of the first gelling solution and second gelling solution is equal to the determined volume of the open hole section. In some embodiments, the amount of gel dissolving solution is in excess of the determined open hole volume, where excess gel dissolving solution, dissolved gel, or both is removed from the well using the CCT. In some embodiments, the plugging gel solution is determined by adding the tubing volume with the open hole section volume to ensure the targeted location of the formation (e.g., the water zone) is plugged.

Method for Plugging a Water Zone

Figure 2:
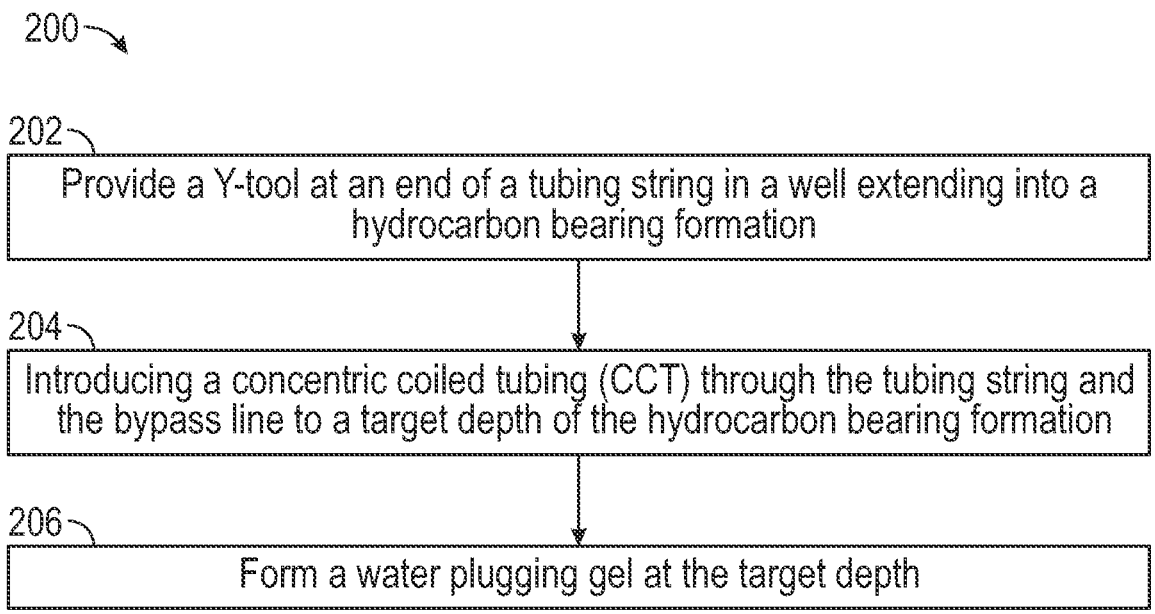
FIG. 2 is a block diagram of a method for plugging a water zone in accordance with one or more embodiments.

In another aspect, one or more embodiments relate to a method for plugging a water zone in a hydrocarbon bearing formation. A non-limiting example of a method for plugging a water zone is shown in the block diagram of FIG. 2. The method 200 includes providing a Y-tool on a tubing string 202. The Y-tool may include an ESP and a bypass line as described above. The tubing string and the Y-tool may be extended into a well, such as a vertical well, into a formation including a water zone as described above.

The method 200 also includes block 204, in which a concentric coiled tubing (CCT) is introduced into the vertical well through the tubing string and the bypass line to a target depth of the hydrocarbon bearing formation. As mentioned above, the target depth may be an open hole section of the well. A bypass plug disposed in the bypass line may be removed prior to introducing the CCT.

In block 206 of the method 200, a water plugging gel may be formed at the target depth. The target depth may include an open hole section of the well including a water zone. Forming the water plugging gel of one or more embodiments includes injecting a solution selected from the group consisting of at least one component of a dissolvable gel, at least one component of a non-dissolvable gel, or combinations thereof. The at least one component of the dissolvable gel may include two or more components as described above, such as a first gelling solution and a second gelling solution. The at least one component of a non-dissolvable gel may include a plugging solution and a crosslinking solution as described above.

Method for Reducing a Concentration of Produced Water

In another aspect, one or more embodiments relate to a method for reducing the concentration of produced water from a hydrocarbon bearing formation. In one or more embodiments, water and hydrocarbon zone locations are determined using one or more production logging tools prior to performing one or more processes described below. Examples of production logging tools that may be used to identify different zones in a wellbore include but are not limited to borehole magnetic resonance tools (which may be used to determine rock porosity, permeability fluid content, and distinguish fluid types by measuring the induced magnetic moment of protons contained within fluid-filled pore space of the formation), borehole fluid conductivity tools (which may measure electric conductivity/resistivity of water/fluid in the borehole to determine changes in fluid resistivity, which reflect differences in dissolved-solids concentration of water and may be used to delineate water-bearing zones in a wellbore), optical or acoustic televiewers, or others known in the art.

Figure 3A:
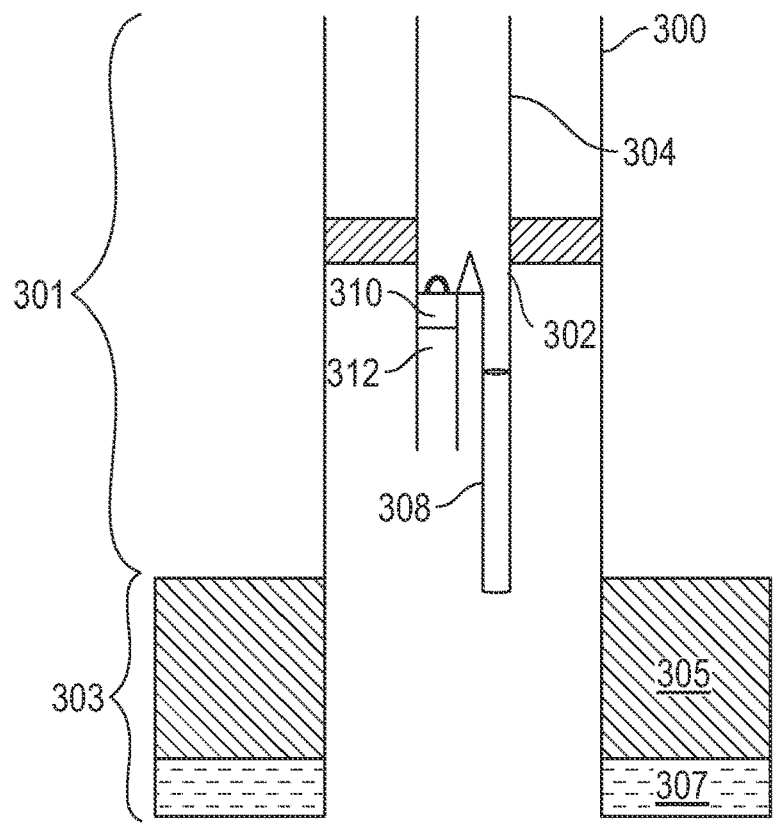
FIGS. 3A-3I are diagrams of a method for reducing a concentration of produced water in accordance with one or more embodiments.

FIGS. 3A-3I are diagrams of a non-limiting example of a method for reducing the concentration of produced water according to one or more embodiments. As shown in FIG. 3A, the method includes providing a Y-tool 302 at an end of a tubing string 304 in a well 300, such as a vertical well. The Y-tool 302 and the tubing string 304 may be as described above and extend into a well through a hydrocarbon bearing formation. One or more sealing components (e.g., a packer or bridge plug) may be used to seal the section of the well in which the Y-tool 302 is disposed. For example, a sealing component sub may be provided between the end of the tubing string 304 and the Y-tool 302 to seal a lower Y-tool portion of the well. The well 300 may include a cased section 301 of the well and an open hole section 303 of the well. The open hole section may include a hydrocarbon zone 305 and a water zone 307.

Figure 3B:
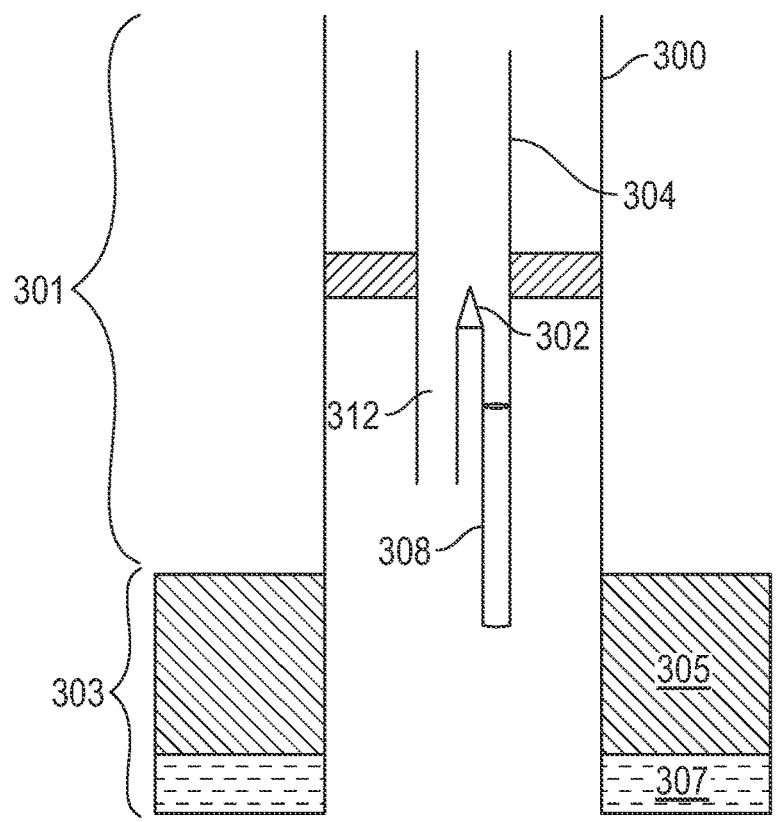

As shown in FIG. 3A, the Y-tool may be connected to an electric submersible pump (ESP) 308. In some embodiments, a Y-tool may include a bypass plug 310 positioned to plug the bypass line of the Y-tool. In such embodiments, bypass plug 310 is removed as shown in FIG. 3B to provide tool accessibility to the wellbore via bypass line 312.

Figure 3C:
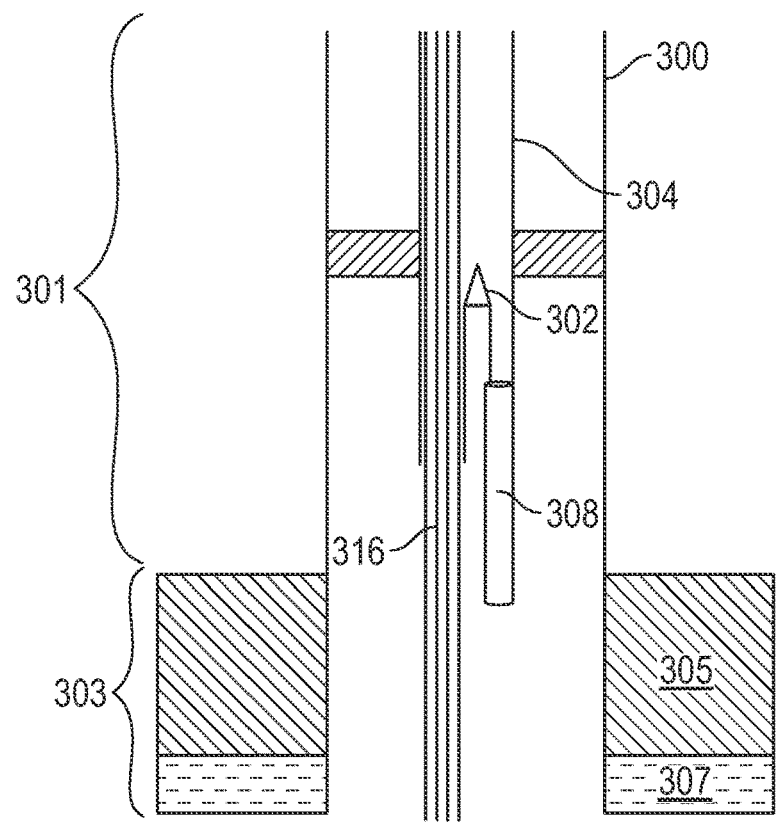
Figure 3D:
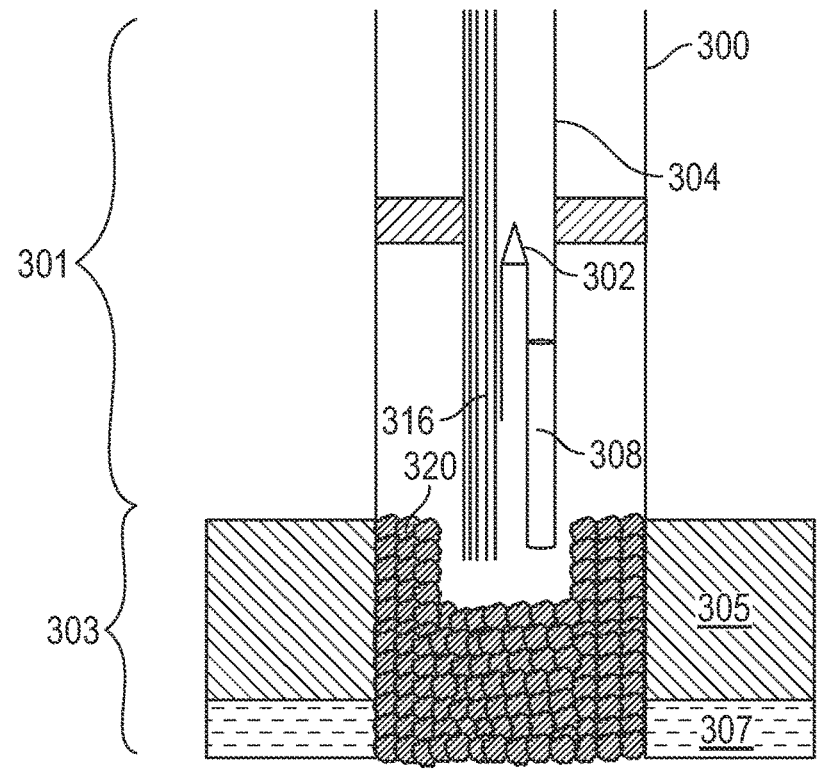

As shown in FIG. 3C, when accessibility is available through the bypass line 312, a CCT 316 is run through the bypass line 312 to an open hole section 303 of the well. In FIG. 3D, the method includes forming a dissolvable gel 320 in the well 300. The dissolvable gel 320 may be formed in the open hole section 303 of the well 300 to cover (and thus prevent) wellbore access to both the water zone 307 and the hydrocarbon zone 305. For example, as shown in FIG. 3D, the dissolvable gel 320 may be formed in a target zone of the open hole section 303 in an amount sufficient to substantially fill the entire target zone of the well (e.g., filling the entire diameter of the well through the section of well being treated).

Forming the dissolvable gel 320 may include injecting a first gelling solution and a second gelling solution, where the first gelling solution and the second gelling solution may be as described above. The first gelling solution may be injected via an inner passage of the CCT 316 into the open hole section 303 of the well 300, and a second gelling solution may be injected via an outer passage of the CCT 316 into the open hole section 303 of the well 300. As an example, a first gelling solution containing water and 10 wt % colloidal silica may be injected via the inner passage of the CCT 316, and a second gelling solution containing water and 10 wt % NaCl may be injected via the outer passage of the CCT 316, where the first and second gelling solutions may mix and form the dissolvable gel 320 as the solutions exit the end of the CCT 316. However, other compositions of at least one dissolvable gel component, such as first and second gelling solutions, may be used to form a dissolvable gel, as discussed above.

In some embodiments, one or more nozzles may be provided at an outlet end of the CCT, which may be used to direct components being ejected from the CCT toward the wellbore wall. For example, a CCT nozzle assembly having one or more nozzles angled radially outward from the CCT central axis may be provided at the outlet end of the CCT, where the first and second gelling solutions may be ejected radially outwardly from the CCT towards the wellbore wall.

In some embodiments, the open hole section 303 of the well may be at the bottom of the well, In such embodiments, the CCT 316 may fill the open hole section of the well by ejecting the components to fill the entire wellbore diameter along a distance from the bottom of the well (which may fill an open hole volume as calculated above). In some embodiments, the open hole section of the well being treated may be located above the bottom of the well. In such embodiments, a plug (e.g., a dissolvable plug) may be provided at the lower side of the identified water zone 307 to seal the treated open hole section of the well from a lower portion of the well, and the CCT 316 may fill the open hole section of the well by ejecting the components to fill the entire wellbore diameter along a distance from the plug (e.g., to fill an open hole volume as calculated above).

In one or more embodiments, the method includes withdrawing the CCT 316 out of the open hole section 303 of the well (where the end of the CCT moves in a direction toward the surface of the well) while simultaneously injecting the first gelling solution and the second gelling solution into the open hole section of the well. In such manner, as an outlet at the end of the CCT 316 is moved a distance through the open hole section 303 of the well 300 (e.g., from a bottom of the well or from a plug sealing the treated open hole section of the well from a lower portion of the well), the gelling solutions may be injected along the distance of the open hole section 303 to cover the wellbore wall along the distance.

Figure 3E:
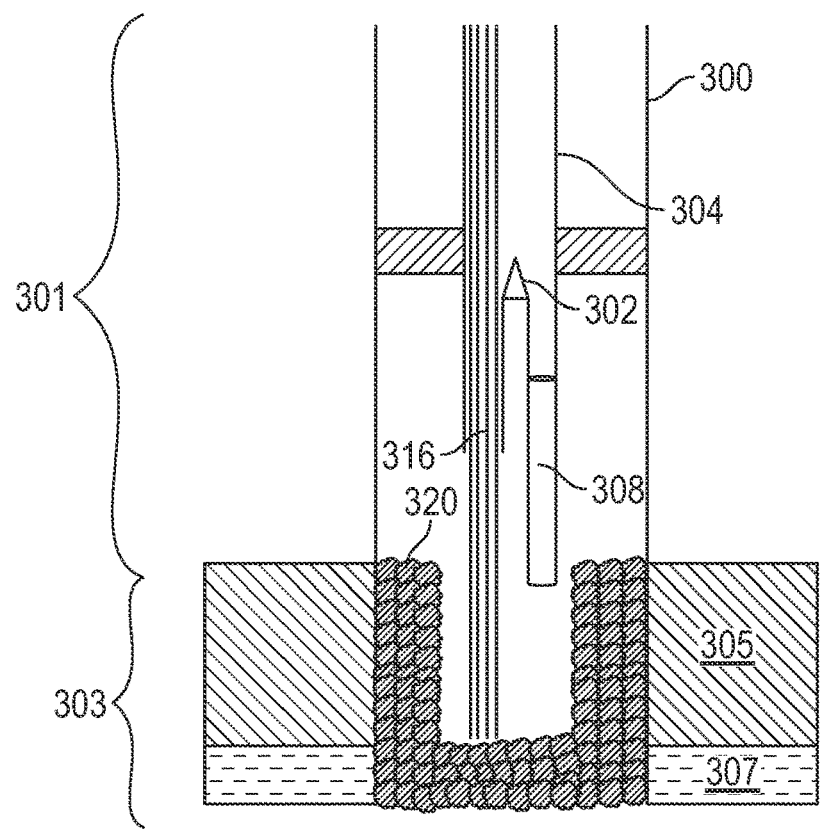

After the dissolvable gel 320 is provided along a target zone of the open hole section 303 of the well, to cover well access to both the water zone 307 and the hydrocarbon zone 305, a portion of the dissolvable gel 320 may be dissolved to expose wellbore access to the water zone 307, as shown in FIG. 3E. In one or more embodiments, dissolving a portion of the dissolvable gel 320 may include leaving a remaining portion of the dissolvable gel 320 that covers wellbore access to the hydrocarbon zone 305. The remaining portion of the dissolvable gel 320 covering wellbore access to the hydrocarbon zone 305 may be provided as a layer of the dissolvable gel 320 that covers the wellbore wall in the hydrocarbon zone 305.

Dissolving the dissolvable gel 320 may include injecting a gel dissolving solution through an inner passage of the CCT 316 into the well 300 to contact and dissolve the dissolvable gel 320. The gel dissolving solution may be as described above. For example, a gel dissolving solution may be made of water and 20 wt % KOH. The CCT 316 may be ran into the well 300 (where the end of the CCT 316 moves in a direction away from the surface of the well) while injecting the gel dissolving solution until the CCT 316 extends through the water zone 305. According to embodiments of the present disclosure, gel dissolving solution may be pumped into a target depth of the well corresponding with the location of a water zone until the dissolvable gel 320 on the wellbore wall in the water zone is dissolved and the water zone is exposed to the well. In such embodiments, the water zone may be referred to as an exposed water zone 315 as shown in FIG. 3F.

The amount of gel dissolving solution, the composition of the gel dissolving solution, the pump rate, and/or the speed at which the end of the CCT 316 is moved through the well may be selected to provide the exposed water zone 315 while also maintaining a layer of dissolvable gel 320 around the wellbore wall in the hydrocarbon zone 305. For example, in some embodiments, while pumping a gel dissolving solution through the inner passage of the CCT 316 at a pump rate, the CCT 316 may be run in-hole relatively quickly through hydrocarbon zone 305 (e.g., at a calculated speed and at the selected pump rate to deliver an amount of the gel dissolving solution that is not capable of removing all of the dissolvable gel around the wellbore wall) and relatively slowly through the water zone 307 (e.g., at a calculated speed and at the selected pump rate to deliver an amount of the gel dissolving solution capable of removing most or all of the dissolvable gel around the wellbore wall). In some embodiments, the CCT 316 may be run in-hole while pumping a gel dissolving solution through the inner passage of the CCT 316 at a relatively low pump rate through hydrocarbon zone 305 (e.g., at a calculated pump rate to deliver an amount of the gel dissolving solution that is not capable of removing all of the dissolvable gel around the wellbore wall) and at a relatively high pump rate (e.g., the maximum pump rate of the well pump system) through the water zone 307 (e.g., at a calculated pump rate to deliver an amount of the gel dissolving solution capable of removing most or all of the dissolvable gel around the wellbore wall). In such manner, as shown in FIG. 3F, wellbore access to the exposed water zone 315 is achieved while restricting wellbore access to hydrocarbon zone 305.

In some embodiments, as gel dissolving solution is pumped through the inner passage of the CCT 316, a vacuum may be applied through the outer passage of the CCT 316 at a selected interval to control the amount of gel dissolving solution that contacts the dissolvable gel 320. For example, in some embodiments, the vacuum may be applied as the end of the CCT 316 ejecting the gel dissolving solution moves through the hydrocarbon zone 305 of the well to limit the amount of gel dissolving solution that is ejected into the well along the hydrocarbon zone 305. Additionally, as the gel dissolving solution contacts and dissolves the dissolvable gel 320, the vacuum may suction the dissolved gel components through the outer passage of the CCT 316. In such manner, the vacuum may be used to circulate the gel dissolving solution along with the dissolved gel components.

Figure 3F:
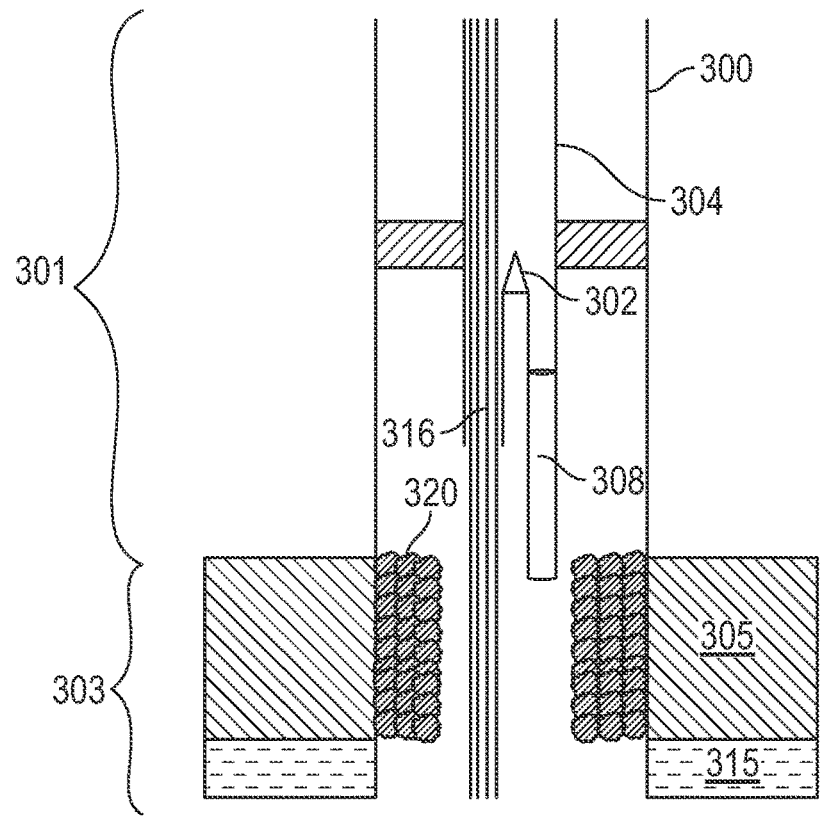
Figure 3G:
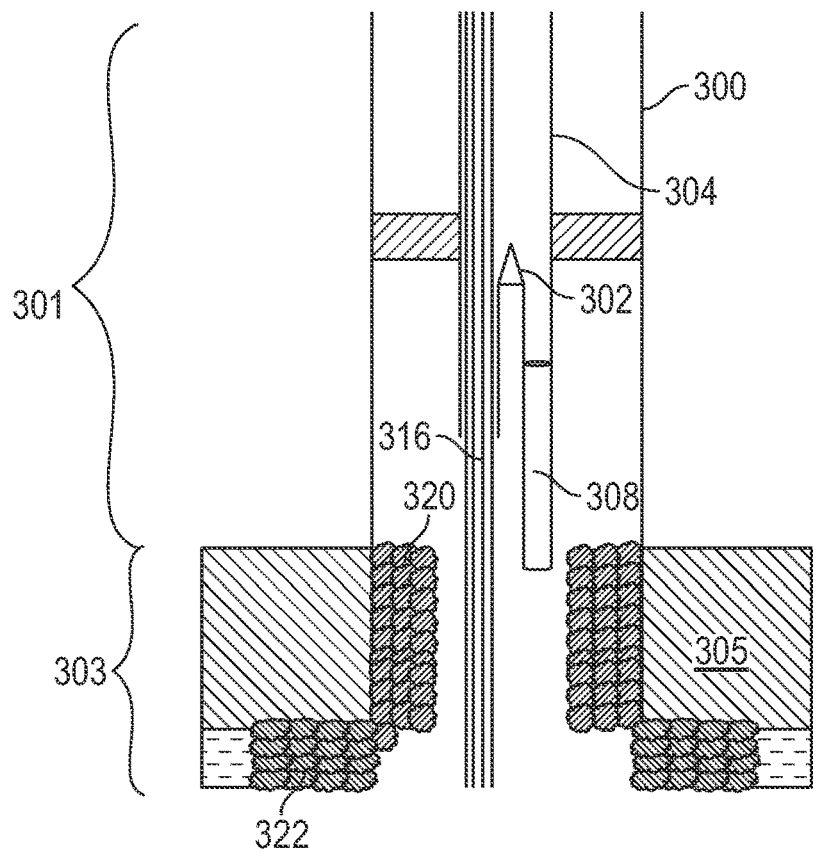
Figure 3H:
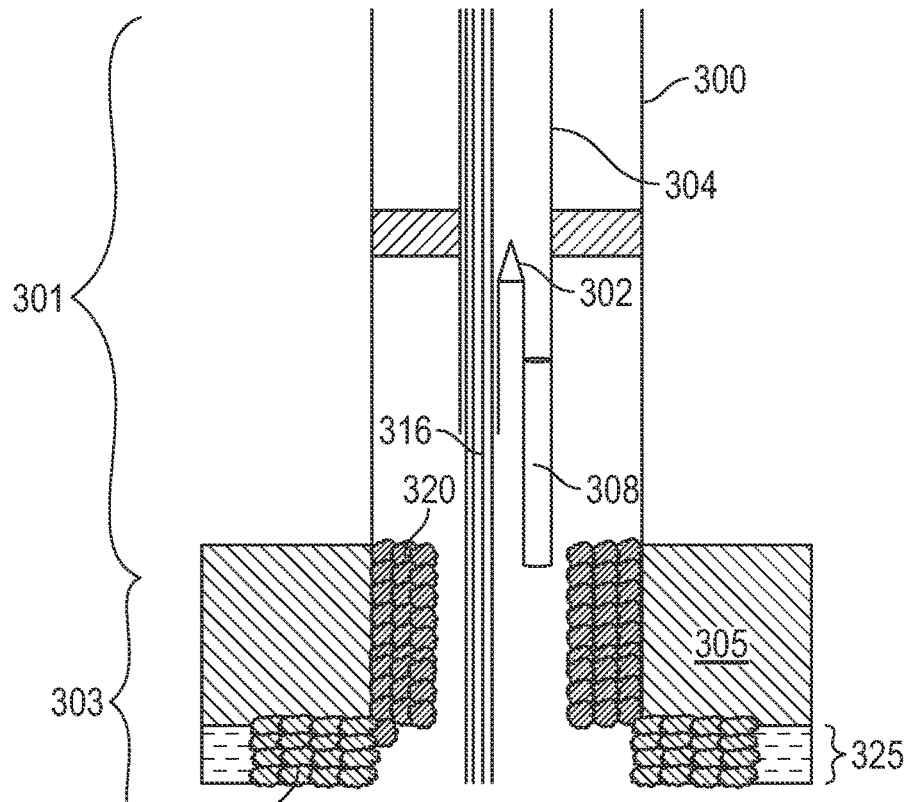

After an exposed water zone 315 and covered hydrocarbon zone 305 are formed in the well using the dissolvable gel 320 and gel dissolving solution, as shown in FIG. 3F, a non-dissolvable gel may be formed around the water zone in order to plug the exposed water zone. In one or more embodiments, the method includes plugging the exposed water zone as shown in FIGS. 3G and 3H by injecting a plugging solution and a cross-linking solution through the CCT 316 into the well at the exposed water zone 315. The plugging solution and cross-linking solution may be injected in separate stages. For example, as shown in FIG. 3G, a plugging solution 322 may be injected into the well along the exposed water zone 315 via the CCT 316, where the plugging solution 322 may flow into the water zone through the exposed wellbore wall. The plugging solution 322 may be made of water, N,N'-methylenebisacrylamide (Bis), N,N'-(1,2-dihydroxyethylene) bisacrylamide (DHEBA), and acrylamide polyacrylamide, or other composition as described above. The plugging solution may be injected proximate to the exposed water zone 315 such that the plugging solution enters and mixes with the exposed water zone 315.

In some embodiments, a nozzle is employed at the outlet end of the CCT string to direct the flow of the dissolvable gel, the gel dissolving solution, the plugging solution, or combinations thereof. In some embodiments, the amount of the dissolvable gel, gel dissolving solution, plugging solution, or combinations thereof is sufficient to fill the entire well diameter.

After the plugging solution 322 is pumped into the exposed water zone, a crosslinking solution may be injected into the exposed water zone 315. The crosslinking solution may be made of, for example, a composition of water, tetramethyl ethylenediamine (TEMED), and ammonium persulfate, or other composition as described above. The plugging solution and the crosslinking solution may mix in the exposed water zone 315 around the wellbore wall, where the crosslinking solution may activate the plugging solution 322. For example, the compositions of plugging solutions 322, as described above, may be designed to damage the permeability of the formation when activated, which restricts fluid flow from the treated formation. Additionally, when the crosslinking solution activates the plugging solution 322, a non-dissolvable gel 324 may form around the treated wellbore wall, as shown in FIG. 3H. In such embodiments, a layer of non-dissolvable gel 324 forms around the water zone, thereby plugging the water zone and producing a blocked water zone 325. As such, wellbore access to the water zone may be prevented.

Figure 3I:
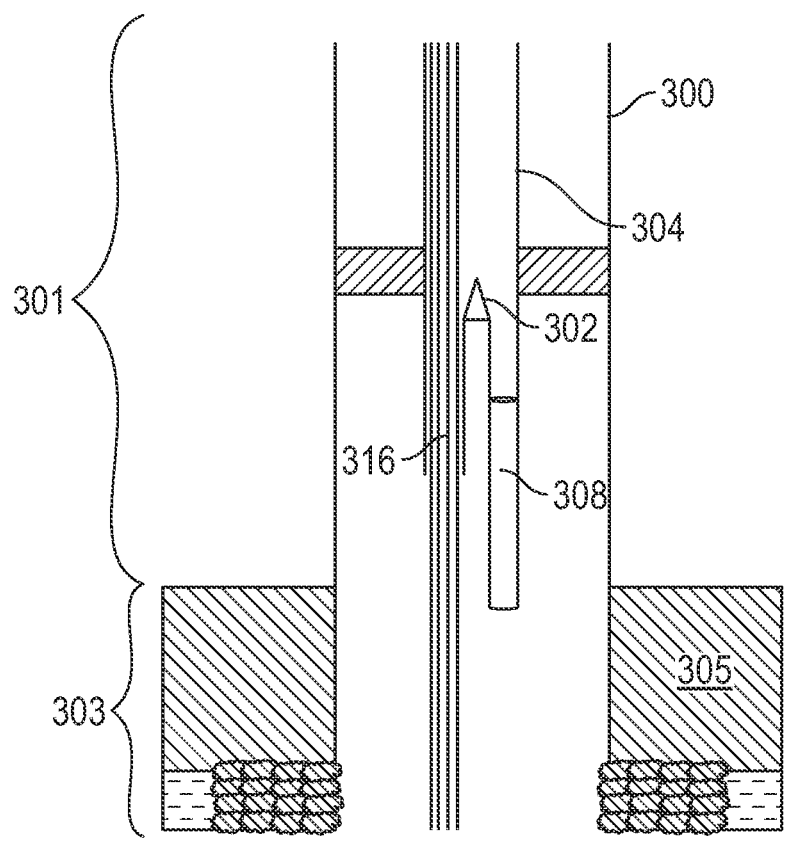

In FIG. 3I, the remaining portion of the dissolvable gel 320 covering the wellbore access to the hydrocarbon zone 305 may be dissolved using a gel dissolving solution. For example, the same gel dissolving solution used to dissolve the dissolvable gel 320 around the water zone may be used to dissolve the dissolvable gel around the hydrocarbon zone. As the gel dissolving solution is pumped through the CCT 316 to dissolve the dissolvable gel around the hydrocarbon zone 305, the CCT 316 may be run out of hole (where the end of the CCT 316 moves in a direction toward the surface), such that the end of the CCT 316 where the gel dissolving solution is ejected moves across the entire distance of the hydrocarbon zone. After the gel dissolving solution is pumped to the hydrocarbon zone to dissolve the remaining dissolvable gel, wellbore access is provided such that fluid communication between the hydrocarbon zone 305 and the well 300 is provided.

One or more embodiments of the present disclosure may reduce a water cut (i.e., the amount of a produced water) of a produced fluid compared to a produced fluid generated without one or more methods. For example, the amount of produced water in a produced fluid may be reduced to less than 15 wt % based on the total weight of the produced fluid. In some embodiments, the amount of is reduced to less than 10 wt % based on the total weight of the produced fluid, or to less than 5 wt % based on the total weight of the produced fluid.

According to embodiments of the present disclosure, the CCT 316 may then be pulled out of hole and a bypass plug may be re-set in the bypass line of the Y-tool. One or more hydrocarbons from the hydrocarbon zone 305 may then be produced to the surface of the well 300. In some embodiments, the ESP line of the Y-tool may be used to aid in producing the hydrocarbons to the surface.

Methods such as shown in FIGS. 3A-3I and described above may provide a benefit of a reduced portion of a water cut via a water shut-off process without the use of a mechanical packer.

Embodiments of the present disclosure may provide at least one of the following advantages. Systems and methods of one or more embodiments may reduce the production of formation water from a reservoir. Systems and methods of one or more embodiments may reduce a water cut in the production of target formation fluids from a reservoir. The target formation fluids include one or more hydrocarbon based fluids, one or more gases, or both. Systems and methods disclosed herein may allow for water shut-off in an oil and gas well with the installation of an ESP with a Y-tool without the use of a mechanical packer to isolate a water zone in the well.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for plugging a water zone in a hydrocarbon bearing formation, the method comprising:
   providing a Y-tool at an end of a tubing string in a well extending into the hydrocarbon bearing formation, the Y-tool comprising an electric submersible pump and a bypass line;
   introducing a concentric coiled tubing (CCT) through the tubing string and the bypass line to a target depth of the hydrocarbon bearing formation, wherein the target depth of the well comprises a water zone and a hydrocarbon zone;
   forming a dissolvable gel in the well to cover wellbore access to the hydrocarbon zone in the well;
   forming a water plugging gel in the well to cover wellbore access to the water zone in the well; and
   dissolving the dissolvable gel to expose wellbore access to the hydrocarbon zone to provide fluid communication between the hydrocarbon zone and the well while the wellbore access to the water zone is covered.

2. The method of claim 1, further comprising:
   removing a bypass plug disposed in the bypass line before introducing the CCT.

3. The method of claim 1, wherein forming the water plugging gel comprises forming a gel from at least one component of a dissolvable gel, at least one component of a non-dissolvable gel, or both.

4. A method for reducing a concentration of produced water from a hydrocarbon bearing formation, the method comprising:
   providing a Y-tool at an end of a tubing string in a well extending into the hydrocarbon bearing formation;
   introducing a concentric coiled tubing (CCT) through the tubing string and through a bypass line of the Y-tool to an open hole section of the well;
   forming a dissolvable gel in the open hole section of the well to cover wellbore access to a water zone and a hydrocarbon zone in the open hole section of the well;
   dissolving a portion of the dissolvable gel to expose wellbore access to the water zone and provide a remaining portion of the dissolvable gel covering wellbore access to the hydrocarbon zone;
   plugging the water zone via injection of a plugging solution and a cross-linking solution to form a non-dissolvable gel covering the wellbore access to the water zone; and
   dissolving the remaining portion of the dissolvable gel covering the wellbore access to the hydrocarbon zone to provide fluid communication between the hydrocarbon zone and the well.

5. The method of claim 4, wherein forming the dissolvable gel comprises:
   injecting a first gelling solution via an inner passage of the CCT into the open hole section of the well; and
   injecting a second gelling solution via an outer passage of the CCT into the open hole section of the well.

6. The method of claim 5, further comprising pulling the CCT out of the open hole section of the well while simultaneously injecting the first gelling solution and the second gelling solution into the open hole section of the well.

7. The method of claim 5, wherein the first gelling solution comprises a first aqueous fluid and colloidal silica, and wherein the second gelling solution comprises a second aqueous fluid and sodium chloride.

8. The method of claim 4, wherein dissolving the dissolvable gel comprises injecting a gel dissolving solution comprising a third aqueous fluid and potassium hydroxide.

9. The method of claim 4, wherein dissolving the dissolvable gel comprises:
   injecting a gel dissolving solution through an inner passage of the CCT into the open hole section of the well;
   running the CCT into the open hole section of the well while injecting the gel dissolving solution until the CCT extends through the water zone; and
   vacuuming contents in the well through an outer passage of the CCT while the CCT is extended through the water zone.

10. The method of claim 4, further comprising producing one or more hydrocarbons from the formation.

* * * * *